United States Patent
Treverton et al.

(10) Patent No.: US 6,913,294 B2
(45) Date of Patent: Jul. 5, 2005

(54) COUPLING FOR COAXIAL CONNECTION OF FLUID CONDUITS

(75) Inventors: Andrew Clare Treverton, Stirling (CA); Leonard J. Park, Belleville (CA); Steve Roger Foster, Belleville (CA); Edward Alexander Mann, Picton (CA)

(73) Assignee: Halla Climate Control Canada, Inc., Belleville (CA)

( * ) Notice: Subject to any disclaimer, the term of this patent is extended or adjusted under 35 U.S.C. 154(b) by 12 days.

(21) Appl. No.: 10/294,439

(22) Filed: Nov. 14, 2002

(65) Prior Publication Data

US 2004/0094958 A1 May 20, 2004

(51) Int. Cl.[7] .......................... F16L 19/00; F16L 21/00; F16L 23/00
(52) U.S. Cl. .......................... 285/406; 285/81; 285/87; 285/334.5; 285/420; 285/373; 285/417; 285/419
(58) Field of Search ................................. 285/417, 420, 285/81, 82, 87, 330, 334.5, 45, 369, 373, 419

(56) References Cited

U.S. PATENT DOCUMENTS

| | | | | |
|---|---|---|---|---|
| 142,388 A | * | 9/1873 | Goble | 285/398 |
| 1,604,211 A | | 10/1926 | Williams | |
| 3,471,175 A | | 10/1969 | Newton | |
| 3,495,853 A | * | 2/1970 | Furrer | 285/81 |
| 3,902,747 A | * | 9/1975 | Weinhold | 285/369 |
| 4,168,090 A | * | 9/1979 | Kaufmann, Jr. | 285/302 |
| 4,386,919 A | * | 6/1983 | Kadono | 441/133 |
| 4,422,674 A | * | 12/1983 | Steuernagle | 285/30 |
| 4,452,097 A | * | 6/1984 | Sunkel | 74/502.4 |
| 4,463,972 A | | 8/1984 | Weinhold | |
| 4,754,995 A | * | 7/1988 | Takahashi et al. | 285/353 |
| 4,795,197 A | * | 1/1989 | Kaminski et al. | 285/12 |
| 4,900,070 A | * | 2/1990 | Runkles et al. | 285/233 |
| 5,048,875 A | * | 9/1991 | Usui et al. | 285/319 |
| 5,219,188 A | | 6/1993 | Abe et al. | |
| 5,269,572 A | | 12/1993 | Mefferd | |
| 5,480,193 A | * | 1/1996 | Echols et al. | 285/45 |
| 5,620,210 A | | 4/1997 | Eyster et al. | |
| 5,647,612 A | | 7/1997 | Yoshida et al. | |
| 6,050,615 A | | 4/2000 | Weinhold | |
| 6,102,448 A | | 8/2000 | Fixemer et al. | |
| 6,106,028 A | | 8/2000 | Godeau et al. | |
| 6,155,607 A | | 12/2000 | Hewitt et al. | |
| 6,668,865 B2 | * | 12/2003 | Miyamoto et al. | 138/108 |

* cited by examiner

Primary Examiner—James M. Hewitt
(74) Attorney, Agent, or Firm—Baker & Daniels (57) ABSTRACT

A coupling is designed for sealingly connecting two fluid conduits such as automotive fluid lines in axial end-to-end relationship. The conduits have respective telescopically interengaging male and female end sections and the coupling comprises a base member to be carried on one of the fluid conduits and a retaining structure mounted on the base member and having two C-shaped arms which can be interconnected around the other conduit end section. A releasable lock acts between the arms to lock the retaining structure in engagement. In the locked condition the axially oriented abutment surfaces in the retaining structure engage peripheral shoulders on the conduits to prevent axial separation of the latter. The coupling can be fabricated from integral plastic components and preferably includes a guard arrangement to shield the releasable lock against inadvertent disengagement.

18 Claims, 11 Drawing Sheets

COUPLING FOR COAXIAL CONNECTION OF FLUID CONDUITS

BACKGROUND OF THE INVENTION a) Field of Invention

This invention relates to a new or improved coupling for sealingly interconnecting two fluid conduits in axial end-to-end relationship.

b) Description of the Prior Art

Automotive fluid lines are typically joined by metal connectors. These are bulky in size and may require extensive brazing or may have multiple components (e.g. springs, collars or bolts) which result in the end product being heavy and quite costly. Furthermore many such couplings that are currently available do not ensure sufficient concentricity between the ends of the conduits so that the joined forms will eventually leak.

Automotive fluid line couplings currently employed are disclosed in U.S. Pat. Nos. 5,647,612 and 6,155,607.

The couplings shown in U.S. Pat. No. 5,647,612 is fabricated from plastic and includes as a retaining feature an over-molded metal component. However this coupling is not capable of sustaining the concentricity of the tube axes against shifting, so that leakage will eventually result. Furthermore high pressure forces within the tubes produce loads which are concentrated on the snaps and the hinge, potentially causing ultimate failure of the coupling.

U.S. Pat. No. 6,155,607 shows a quick connect coupling that includes a compression joint. However this coupling requires excessive force to interconnect the tubes, and under high pressure excessive forces are transferred to the snaps.

SUMMARY OF THE INVENTION

The object of the present invention is to provide an improved coupling which overcomes some or all of the disadvantages of known prior art couplings. Desirably the improved coupling provides for easy interconnection of fluid conduits in end-to-end relationship while ensuring sealing integrity. The coupling can be pre-assembled to the tube ends prior to their union and desirably is capable of sustaining high operating pressures within the conduits. Furthermore desirably the coupling will provide strong resistance against skewing or axial misalignment of the tubes after assembly, will not hinder the sealing of the joint or O-ring performance, and will be reusable.

In summary, the invention provides a coupling for sealingly connecting two fluid conduits in co-axial end-to-end relationship, wherein the conduits have respective male and female end sections that are configured for telescopic interengagement, each of the conduit end sections having an external peripheral shoulder, said coupling comprising: a base member adapted to be carried on a first one of the fluid conduits adjacent and engaging the peripheral shoulder thereof; and a retaining structure comprising two C-shaped arms that are interengageable in confronting relationship to clampingly grip said base member, said arms including a releasable lock that is operative to lock said retaining structure in engagement with said base member, said retaining structure defining an axially oriented abutment surface for contacting the peripheral shoulder of the second of the conduits when the two conduits are telescopically interengaged and prevent axial separation of the conduits when the retaining structure is in locked condition.

The C-shaped arms are preferably pivotally interconnected on a pivot axis that is defined by an axially oriented pin carried in the base member. The coupling components are preferably fabricated each as an integral plastic structure. The releasable lock may comprise a tooth carried on a resilient finger on one of the arms and a retainer on the other of the arms arranged such that when the arms are swung towards the locked position the finger engages and is deflected by the container until the tooth passes the retainer whereupon the finger is resiliently restored to engage the tooth with the retainer and secure the coupling in installed condition. A guard may be incorporated to protect the lock mechanism and prevent accidental or unauthorized opening of the coupling, possibly by requiring a special tool, while retaining easy assembly. The base member can be designed to be pre-installed on one of the fluid conduits, or can be designed in two parts adapted to be assembled in a radial direction onto the fluid conduit and so can be attached to it after forming that is carried out on the fluid conduit end e.g. to form a projecting peripheral shoulder thereon.

The coupling is preferably designed to be reusable and capable of being adapted to any male or female conduit end form. The coupling is designed to divert operational loads (such as arise due to the pressure within the conduits) from the snaps or retainers and hinges and absorb them in more robust portions of the coupling.

BRIEF DESCRIPTION OF THE DRAWINGS

The invention will further be described, by way of example only, with reference to the embodiments illustrated in the accompanying drawings, wherein.

DESCRIPTION OF THE PREFERRED EMBODIMENTS

Figure 1A:
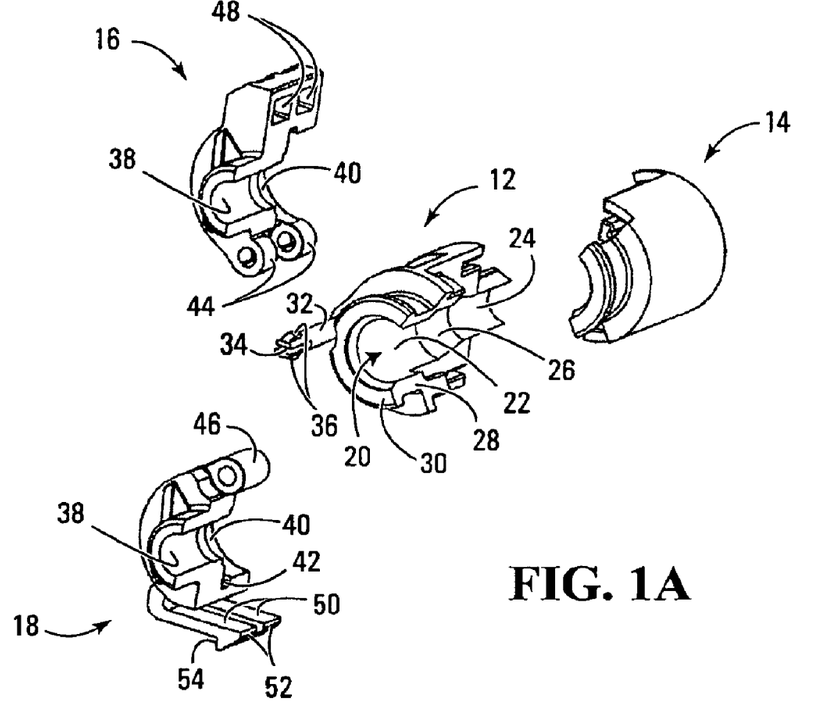
FIG. 1A is an exploded perspective view of one embodiment of the coupling in accordance with the invention.
Figure 1B:
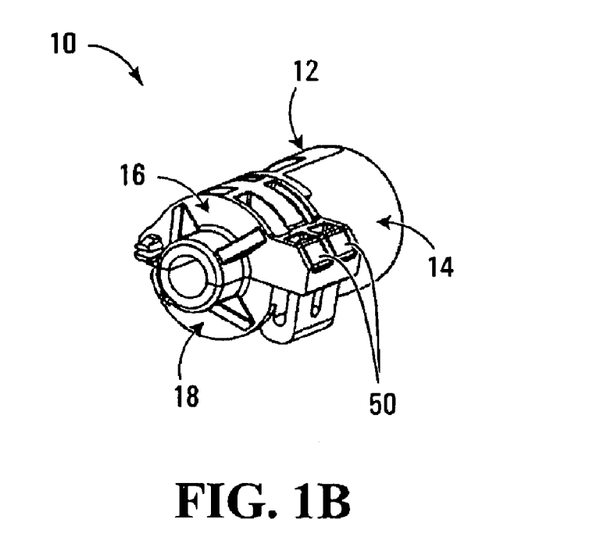
FIG. 1B is a perspective view of the assembled coupling.

The coupling indicated at 10 in FIG. 1B is shown in compact condition with the components interengaged as they would be when the coupling is in operation. The individual components however are shown more clearly in the exploded view of FIG. 1A and will be seen to comprise four principal elements namely a base 12, a base retainer 14, and first and second clamping arms 16, 18.

The base has a stepped cylindrical bore 20 having a larger diameter section 22 and a smaller diameter section 24 joined through a tapered frusto conical portion 26.

All four of the components 12, 14, 16 and 18 are fabricated as injection molded plastic parts, suitable materials being polyaramid (nylon) glass filled, polyurethane, styrene/acrylonitrile copolymer (crystalline or amorphous resins).

As is seen in FIG. 1A the base has a thick peripheral wall that surrounds the stepped cylindrical bore over most of the length of the latter. However at one end the base has a cylindrically curved tubular extension 28 which terminates in a relatively thick radially projecting peripheral flange 30.

The base retainer 14 has a shape that is complementary to that of the base 12 so that together the components 12 and 14 make up a complete annular structure with portions of the stepped bore, the tubular extension 28 and the flange 30 being formed in both the base 12 and the base retainer 14.

Figure 3A:
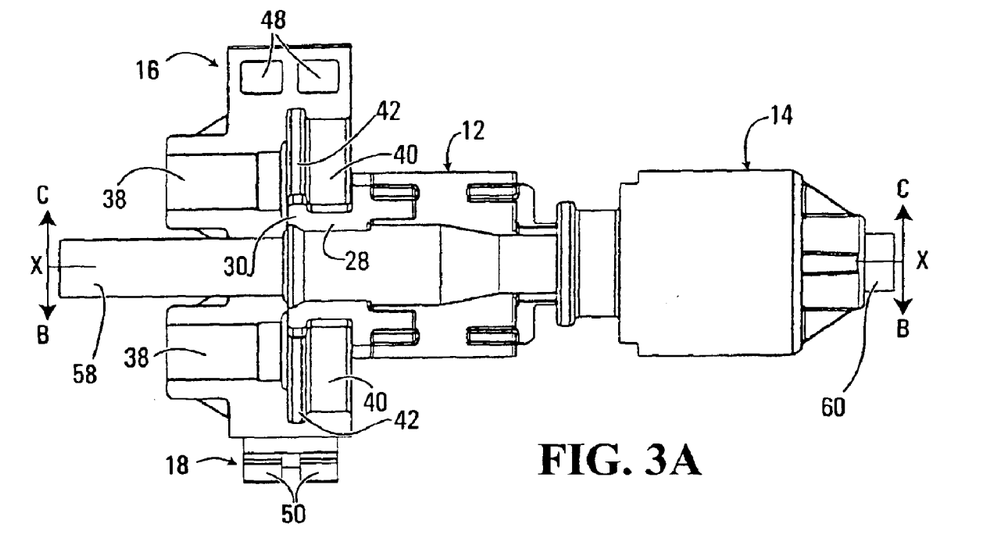
FIG. 3A is a side view corresponding to FIG. 2.

An axially projecting pin 32 of the base 12 extends beyond the collar 30 as is best seen in FIG. 3A. As seen in FIG. 1A the pin 32 has a diametral slot 34 opening from its free end, the periphery of the slotted portion of the pin carrying radial projections 36. As is more fully described below, the axial pin 32 is designed to provide a pivotal mounting for the two remaining components of the coupling namely the first and second clamping arms 16, 18.

With reference to FIG. 1A the clamping arms 16 and 18 are each seen to be of somewhat C-shape having a half bore which contains a small diameter section 38, a large diameter section 40, and a deep arcuate groove 42. To this extent the arms 16 and 18 are complementary and designed to enclose and closely surround the tubular extension 28 and flange 30 of the base/base retainer assembly 12, 14, the flange 30 being received in the arcuate groove 42.

The clamping arm 16 has a pair of projecting bored mounting lugs 44 which are axially spaced by a distance corresponding to the axial length of a projecting bored mounting lug 46 on the clamping arm 18. It will be understood that for assembly of the coupling the projecting lug 46 is positioned between the lugs 44 with their bores brought into axial alignment and the clamping arms 16, 18 are then moved axially to slide the clamping lugs 44, 46 onto the axial pin 32. The bores in the lugs 44, 46 are sized to receive the axial pin 32 with a slight clearance. During assembly, the slot 34 in the end of the pin 32 enables inward flexure of the end portions of the pin so that the radial projections 36 can pass through the aligned bores of the lugs 44, 46 to project laterally axially beyond the outermost of the lugs 44, whereupon the resilient force of the plastic material of the pin will cause the portions of the slotted end of the pin 32 to move outwardly so that the radial projections 36 will now act as retainers to prevent accidental removal of the lugs 44, 46 from the pin 32.

The clamping arm 16 is formed with a pair of through openings 48, these being of rectangular profile and opening from a generally diametrical planar surface of the arm 16.

The clamping arm 18 is formed with a pair of tangentially projecting resilient latches 50 each of which has a thickened end defining a ramp surface 52 adjacent which is a notched tooth 54.

Figure 2:
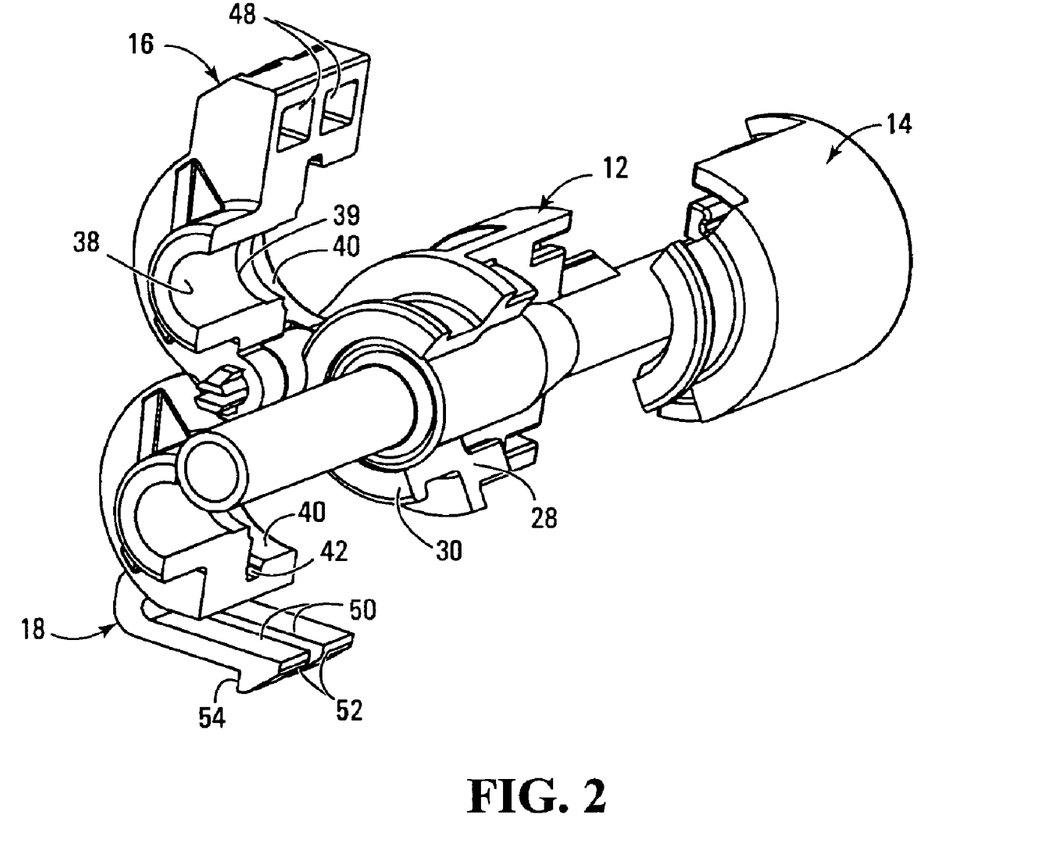
FIG. 2 is a perspective view of the coupling of FIG. 1 showing partially installed to interconnect two conduits end-to-end.
Figure 4A:
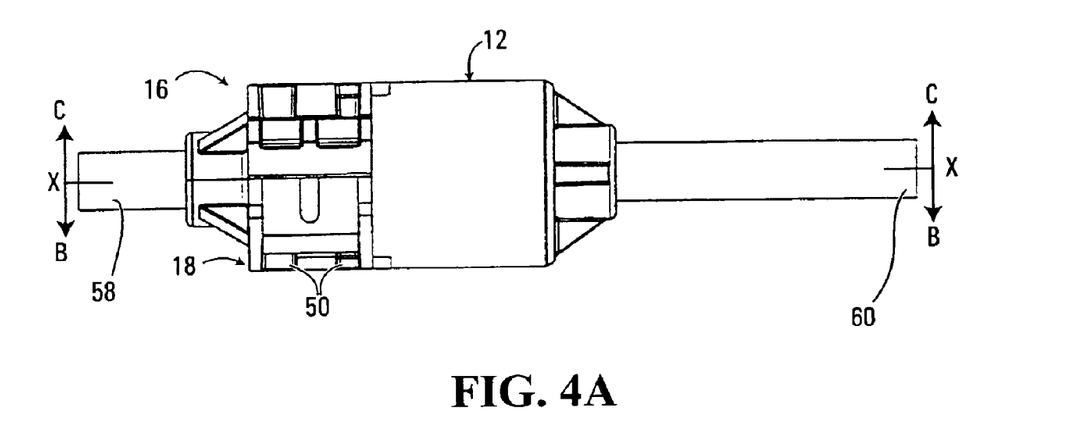
FIGS. 4A, 4B, and 4C are views similar to FIGS. 3A, 3C and 3B respectively showing the coupling in assembled condition.
Figure 4B:
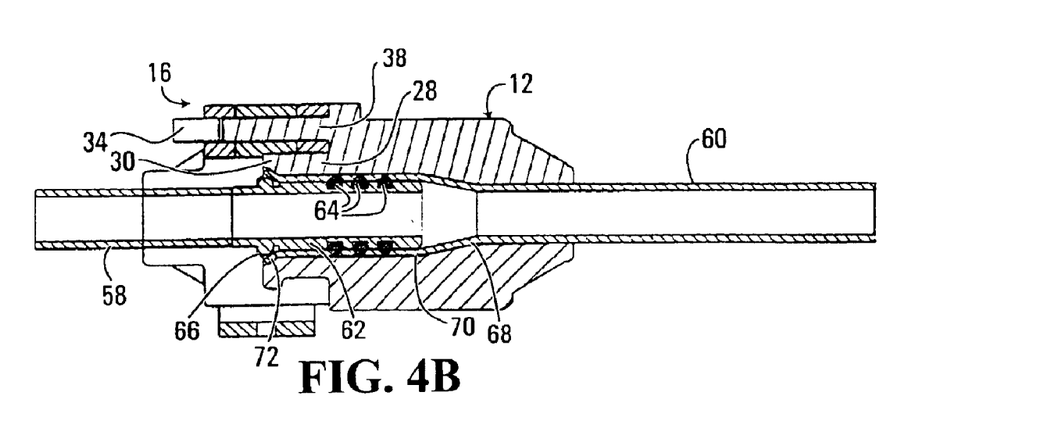
Figure 4C:
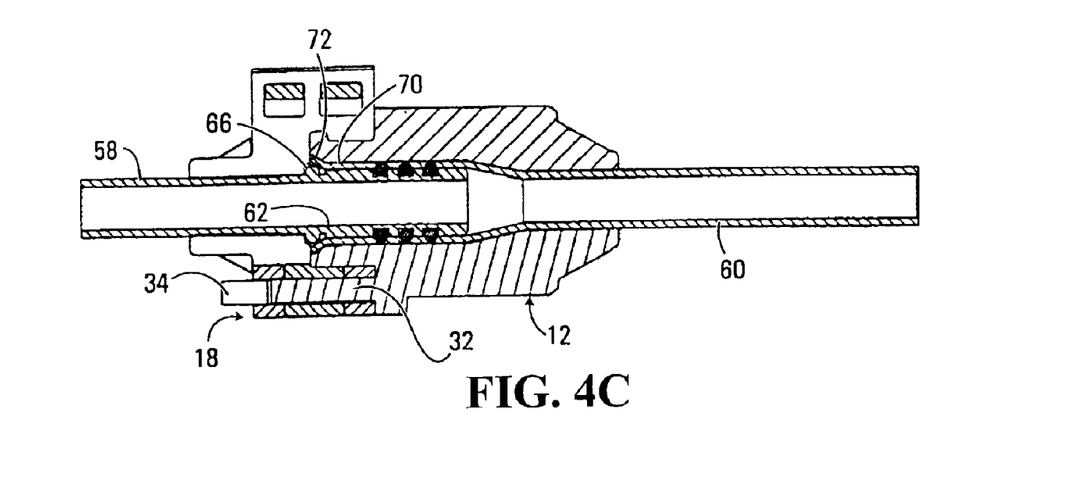

From the foregoing description and the drawings it will be appreciated that when the clamping arms 16 and 18 are mounted on the pin 32 as illustrated in FIG. 2 and swung towards each other, the tip portions of the latches 50 will enter the through holes 48 in the clamping arm 16 and be deflected by engagement of the ramps 52 on the latches against the edges of the holes 48. Continuous pivotal movement of arms 16, 18 towards one another will bring their radial faces into contact at the same time as the latches 50 pass through the opposite end of the holes 48, whereupon the resilience of the material of the latches 50 causes them to straighten so that the notched teeth 54 provide an abutment against the arm 16 by overlapping arm 16 at the edges of the holes or openings 48, which act as retainers, thus maintaining the arms 16 and 18 in firm engagement with each other. This is the configuration that is represented in FIG. 1B of the drawings. The latches 50 therefore operate as a lock to secure the coupling 10 in its engaged position with respect to the conduits 58 and 60 as shown in FIGS. 4A to 4C. Providing two latches 50 increases the security of the connection, since in the (unlikely) event that one of the latches 50 should become displaced out of its locking abutment with respect to the clamping arm 16, the integrity of the connection will nevertheless be guaranteed by the action of the second latch 50.

It will be observed particularly from FIG. 4C that the components of the coupling engage the conduits 58, 60 over a substantial axial length, in the case of the clamping arms 16, 18 more than twice the diameter of the conduit 58, and in the case of the base/base retainer 12, 14 more than four times the diameter of the conduit 60. This plus the tight form locking interengagement of the arms 16, 18 with the tubular extension 28 and flange 30 of the base provides an initial safeguard against any tendency for misalignment to occur between the axes of the conduits 58 and 60.

The assembly of the coupling 12 onto the ends of a pair of coaxial conduits is now described with particular reference to FIG. 2 and FIGS. 3A to 3C and FIGS. 4A to 4C.

The conduits 58, 60 are typically metal tubes with end formations to facilitate their interengagement. As is more clearly shown in FIGS. 3 and 4, the conduit 58 has a thickened end section 62 which is grooved and carries three O-ring seals 64, the thickened portion 62 terminating in a projecting rounded annular rib 66. The conduit 60 has a tapered transition section 68 leading to a widened elongate end section 70 which tube end forms terminates in a flared annular lip 72. Alternate detailed shapes of the tube end forms, including the shape of the O-ring grooves and their number, are well known in the field and can be accommodated by the present coupling.

Figure 3B:
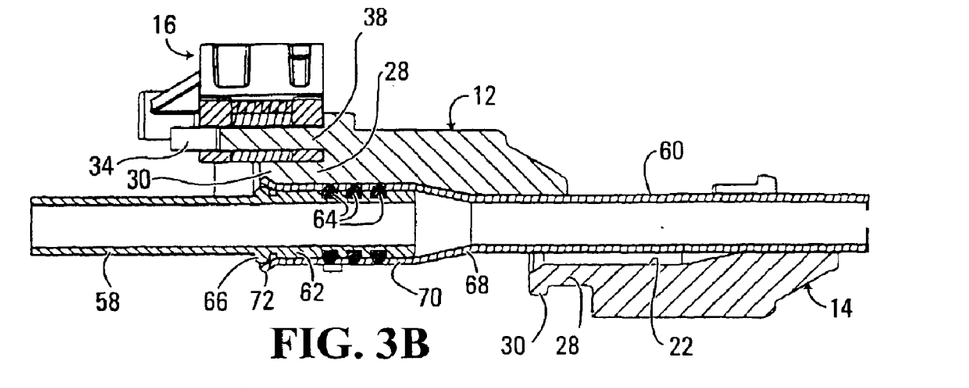
FIG. 3B is a sectional view taken on the line X—X in FIG. 3A in the direction of the arrows B.

Thus, when the conduits 58, 60 are assembled as shown in FIG. 3B the end section 62 is inserted into the end section 70 of conduit 60 until the annular rib 66 comes into engagement with the flared lip 72. The diameters of the end sections 62 and 70 of the conduits are closely matched to ensure good alignment between the conduits 58 and 60 and the annular seals 64 engage against the inner cylindrical surface of the end section 70 providing protection against the escape of fluid from the interior of the conduits.

Figure 3C:
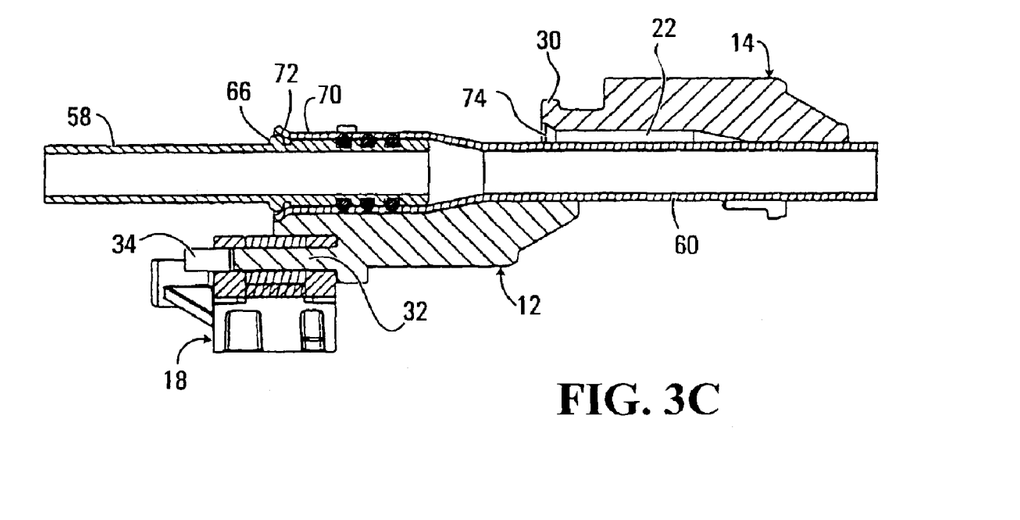
FIG. 3C is a sectional view taken on the line X—X in FIG. 3A in the direction of the arrows C.

The shape of the end section of the conduit 60 corresponds to the interior shape of the bore sections 22, 26, 24 of both the base 12 and the base retainer 14 so that the latter can be assembled together onto the conduit 60 as shown in FIGS. 3 and 4, in which configuration they completely surround the end section 60 of the conduit, the flared lip 72 of the conduit being received in a matching chamfer 74 (see FIG. 3C) at the end of the enlarged bore 22.

With the clamping arms 16 and 18 mounted on the pivot pin 38 as shown in FIGS. 2 and 3a, the coupling could then be installed by springing those arms about the pin 38 as previously described to bring the arms into close engagement around the conduit 58. The projecting annular rib 66 of the conduit 58 abuts the flared lip 72 of the conduit 60, and the arms when locked together by the latches 50 as described above closely surround the conduit 58 and the tubular extension 28 and flange of the base/base retainer 12, 14. Specifically, the bore sections 38 closely surround the conduit 58, an end chamfer portion 39 (see FIG. 2) abutting against the left hand side of the annular rib 66 thus securing the conduit 58 against withdrawal. At the same time the larger bore portions 40 of the arm 16, 18 closely surround the tubular extension 28 and the annular flange 30 is received within the annular recess formed by the arcuate grooves 42.

From the foregoing description and drawings it will be evident that the coupling 10 provides a very secure and leak-proof connection between the formed ends of the conduits 58 and 60. Axial alignment between the conduits is ensured by the substantial overlap and close fit between the complementary end sections 62 and 70, and also by the substantial axial length and the close form locking interconnection between the clamping arm 16, 18, and the base/base retainer 12, 14. Withdrawal of the conduits 58 and 60 from the latched coupling is impossible due to the abutment formed by various surfaces of the coupling with the end section formations of the conduits. Furthermore it will be noted that loads imposed on the coupling due to pressure forces arising within the bores of the conduits does not stress the mechanism of the latches or pivot pin 34, since these forces act in the longitudinal direction whereas the locking movement of the coupling is effected by swinging of the clamping arms 16 and 18 in a plane perpendicular to the length of the conduits. Longitudinal forces are absorbed between the coupling sections by interengagement of the arms 16 and 18 around the projecting annular flange 30 on the base/base retainer assembly 12, 14, and thus do not in any way load the latches 50 or the pivot pin 32.

Referring now to FIGS. 5 through 8, a somewhat simplified version of the coupling is illustrated. In this embodiment the base component 112 is of unitary construction comprising an annular injection molding having a bore 122 sized to closely surround the enlarged section 70 of the conduit 60. As before the bore has at one end a chamfer 174 adapted to engage against the flared lip 72 of the conduit 60. A tubular section 128 of the base extends between a projecting annular flange 130 at one end and a second projecting annular flange 131 at the opposite end, the flange 131 supporting a rigid mounting 133 for an axially extending pin 132 the latter being similar to the pin 32 of the previously described embodiment.

Figures 5A, 5B, 5C:
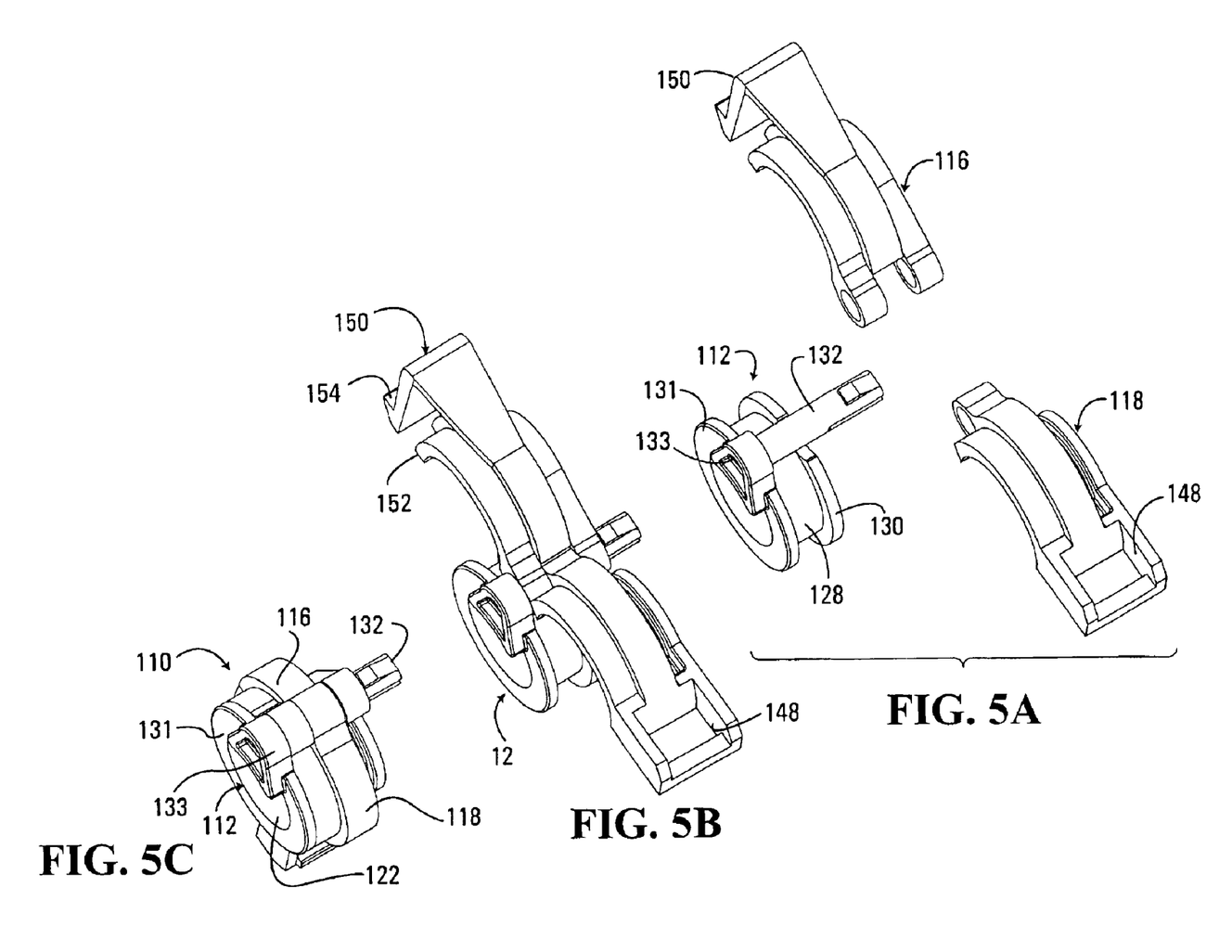
FIG. 5A is an exploded perspective view showing a second embodiment of the coupling.
FIG. 5B is a perspective view of the coupling of FIG. 5A when partly assembled.
FIG. 5C is a perspective view of the coupling of FIG. 5A when fully assembled.

The pin 132 forms a pivotal mounting for a pair of clamping arms 116, 118 which as can be seen from FIGS. 5A to 5B are mounted to be pivotable about the axis of the pin 132. Each clamping arm 116, 118 is of generally semicircular C-shaped configuration and can be swung from an open position as shown in FIG. 5B to a closed latched position as shown in FIG. 5C. The arm 116 thereof has an integral latch 150 resiliently supported thereon and projecting in a generally tangential direction, the arm 118 having a through hole 148 therein. The interengagement of the arms 116 and 118 is similar to that described in relation to the embodiment of FIGS. 1 to 4 namely that as the arms are swung together about the pin 132, the angled ramp 152 of the latch 150 engages the arm 118 at the edge of the opening 148 resiliently deflecting the latch 150 to pass through the opening 148 until the confronting diametral surfaces of the clamping arms 116, 118 come into engagement around the tubular section 128 and flange 130 of the base 112 at which point the tooth 154 of the latch, having passed completely through the opening 148, is resiliently restored to overlap the edge of the arm 118 at the edge of the opening and thus lock the arms in the engaged position that is shown in FIG. 5C.

Figure 6:
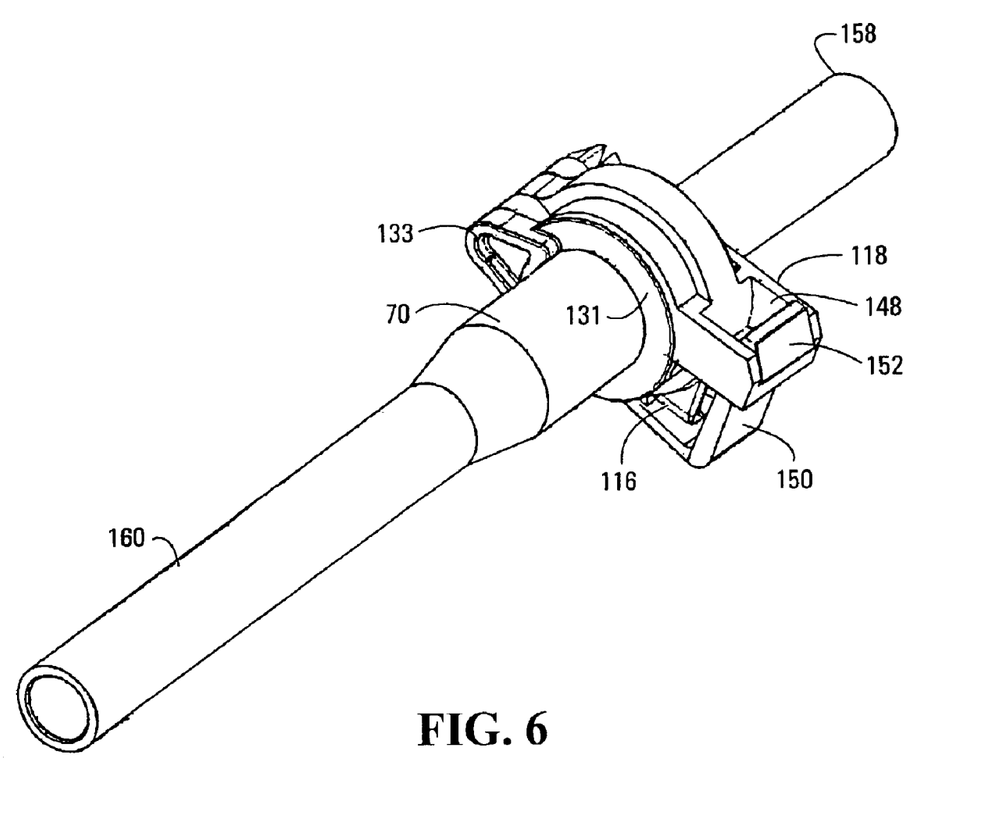
FIG. 6 is a perspective view showing the coupling according to FIG. 5 in installed condition.
Figure 7A:
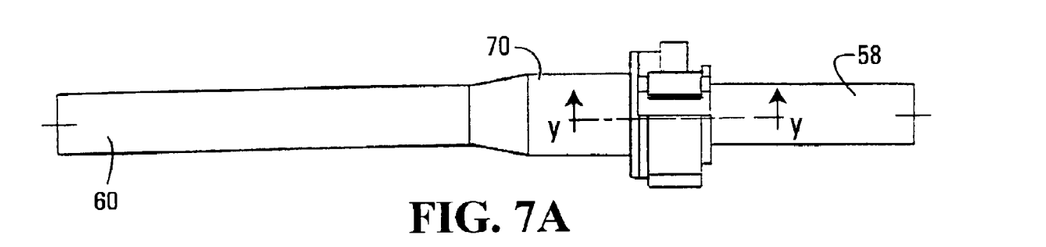
FIG. 7A is a side view of the coupling of FIG. 5 assembled on two conduits.
Figure 8A:
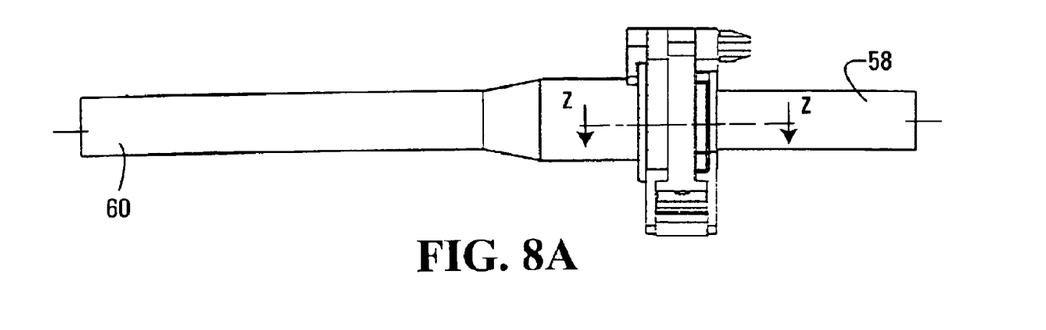
FIG. 8A is a plan view corresponding to FIG. 7.

Referring to FIGS. 6,7A and 8A, the coupling 110 is shown assembled onto the interengaged ends of the conduits 58 and 60. Since the base 112 is a unitary annular structure having an inside bore 122 that is closely matched to the diameter of the widened end section 70 of the conduit 20, it is necessary to slip the base onto the conduit 160 before the latter is end formed to produce the flared lip 72.

When the conduits 58 and 60 are interengaged as before, the base member 112 is moved into position with the chamfer 174 at the end of the bore 122 seated against one side of the flared lip 72, the opposite side of the flared lip being engaged by the annular rib 166 on the conduit 58. With the clamping arms 116, 118 assembled onto the pin 132 as shown in FIG. 5B, the arms are then swung together until they interengage as shown in FIG. 6, firmly securing the conduits in fluid-tight communication in a manner similar to that of the embodiment of FIGS. 1 to 5.

Figure 7B:
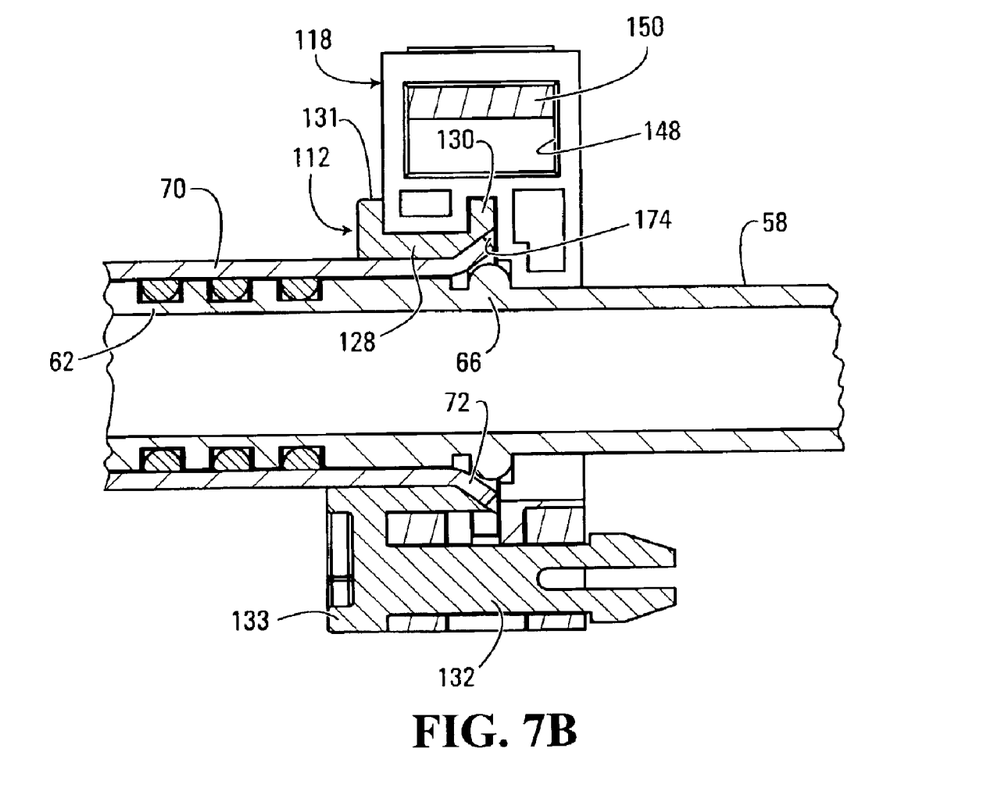
FIG. 7B is an enlarged fragmentary sectional view taken on the line Y—Y in FIG. 7A.
Figure 8B:
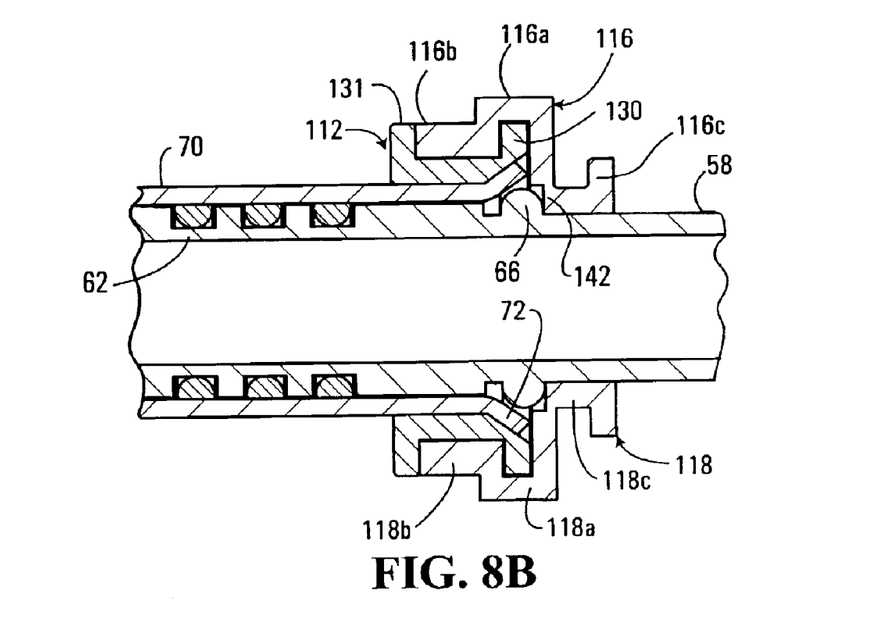
FIG. 8B is an enlarged fragmentary sectional view taken on the line Z—Z in FIG. 8A.

The configuration of the base 112 and the clamping arms 116, 118 and their interengagement are more clearly shown in the enlarged views of FIGS. 7B and 8B. Particularly FIG. 8B shows in cross section the profiles of the clamping arms 116, 118 and how they form lockingly interengage with the base 112. Thus the arms each have a grooved portion 116a, 118a which closely surround and engage the flange 130 of the base, and a cylindrically curved portion 116b, 118b which closely surround the tubular section 128 of the base member and abut axially at opposite ends against the flanges 130, 131 of the base member. A further portion 116c, 118c of each clamping arm closely surrounds the conduit 58, there being an annular groove 142 partly defined in each of the arms 116, 118 which abuts tightly against the peripheral rib 16.

Accordingly, the coupling 110 provides a secure interconnection between the conduits 58, 60 preventing their separation or misalignment. As with the coupling described in relation to FIGS. 1 to 4, in the coupling 112 forces arising as a result of pressure within the conduits does not apply any loading to the clamping arms 116, 118 or their interconnections in a radial or peripheral direction. Rather such forces are absorbed in the axial direction by abutment between the base 112 and the arms 116, 118. The close form locking interengagement of these components ensures a tight coupling is obtained without any slackness or backlash which might ultimately lead to deterioration of the integrity of the interconnection. On the contrary, the coupling embodiments described herein can remain in place for very lengthy periods of service without loss or deterioration. Furthermore these couplings are reusable since they can be dismounted by disconnecting the latch or latches and separating the clamping arms, whereupon the conduits can be moved apart axially without further difficulty.

Figure 9A:
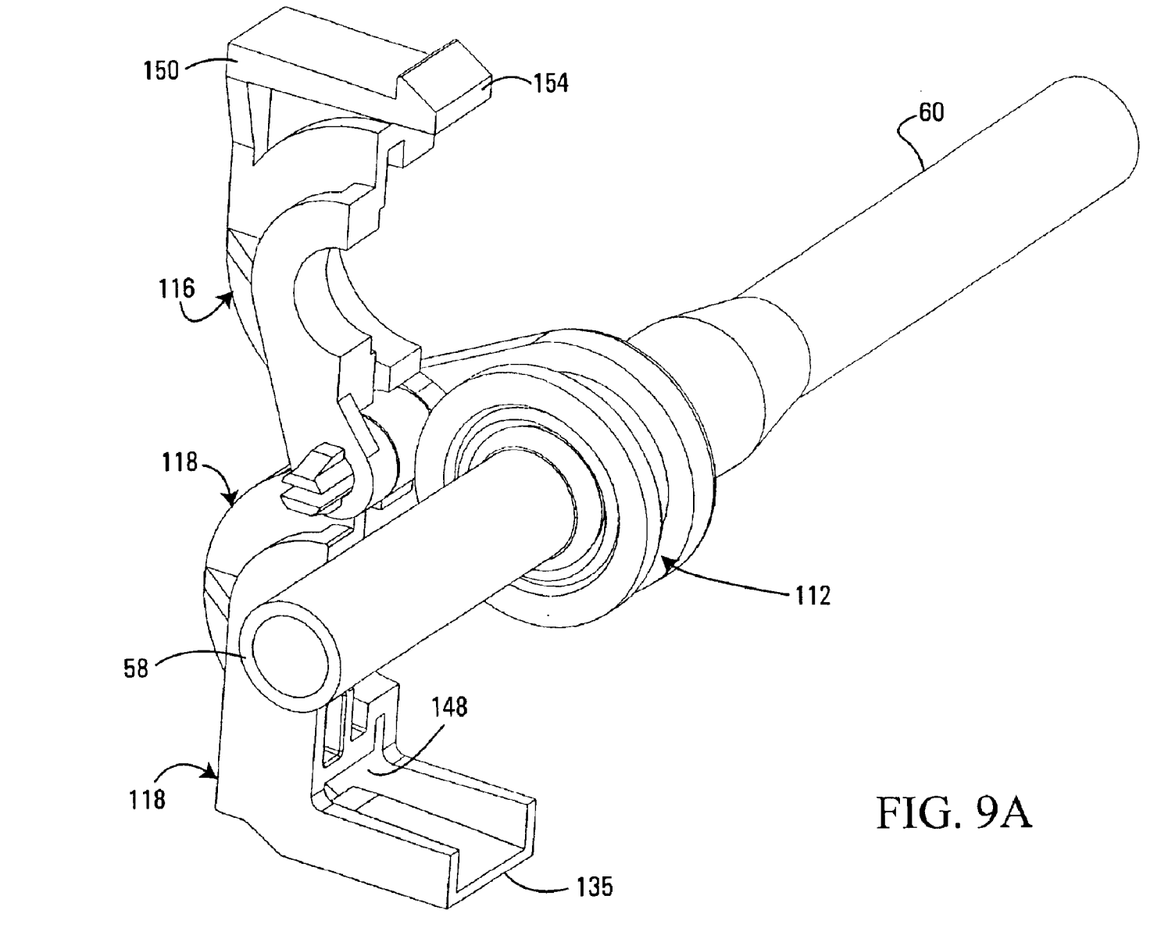
FIG. 9A is a perspective view of a modified coupling shown when partly assembled.
Figure 9B:
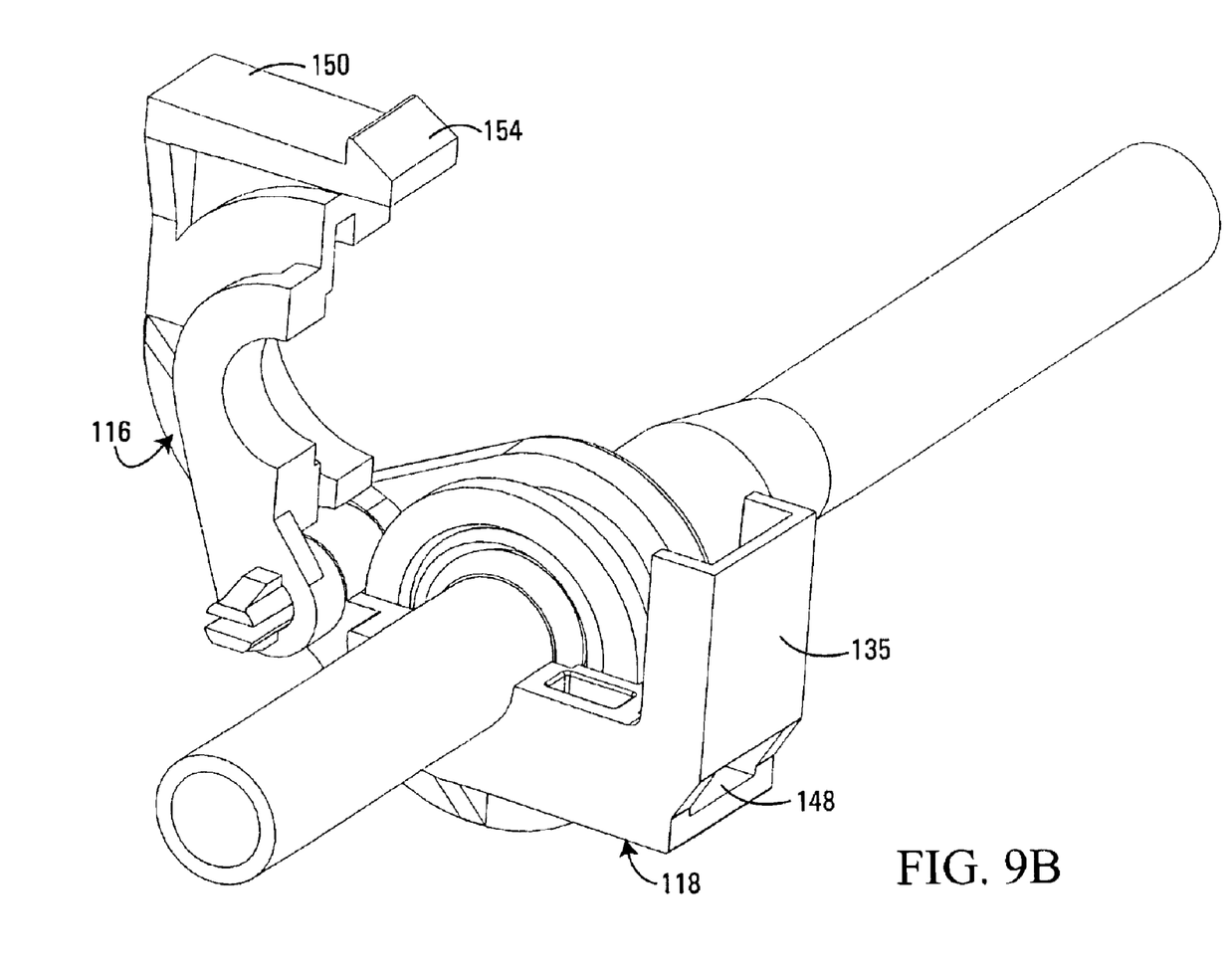
FIG. 9B is a view similar to FIG. 9A showing a successive condition of the coupling.
Figure 9C:
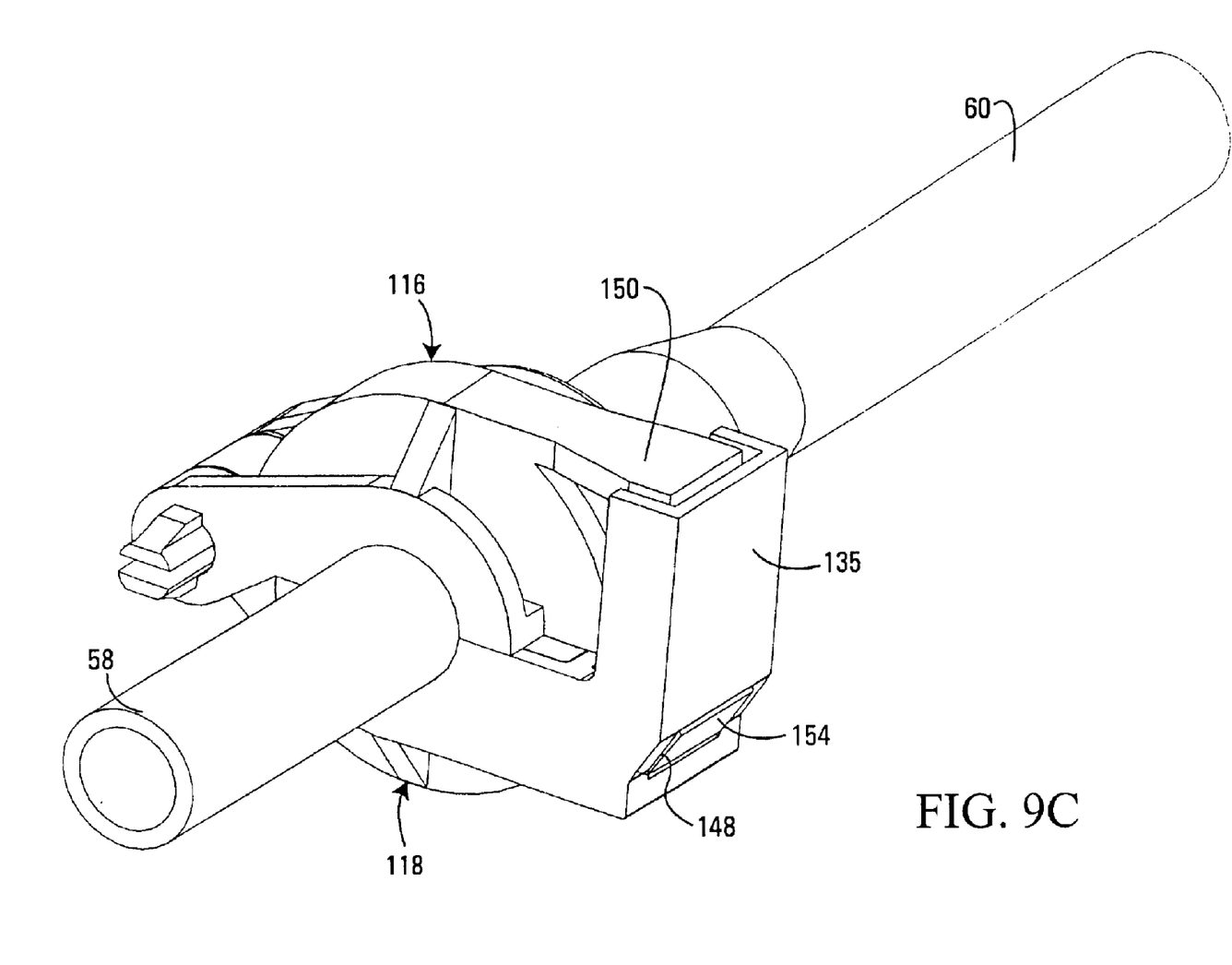
FIG. 9C is a view corresponding to FIGS. 9A and 9B showing the coupling when fully assembled.

The coupling shown in FIGS. 9A to 9C is a modified version of that shown in FIGS. 5A to 5C and comprises a base 112 which provides a pivotal mounting for two clamping arms 116, 118. As before, the clamping arm 116 carries a resiliently mounted latch 150 at the end of which is a notched tooth 154 to be received within a through opening 148 in the second pivoted arm 118. As clearly shown in FIGS. 9A and 9B the arm 118 is modified by the provision of an elongate channel-shaped guard 135 which is shaped to accommodate the latch 150 so that the latter is completely shield from accidental disengagement in the fully assembled condition as seen in FIG. 9C. Thus it will be seen that this embodiment prevents accidental disengagement of the coupling and also, shields the tooth 154 and the arm that supports it against accidental damage. Furthermore a frangible seal or the like could be included to give an indication of any unauthorized tampering or disengagement of the coupling.

It will be appreciated that the components of the couplings described in the foregoing can be varied widely depending upon the particular use requirements. Typically these components will be fabricated by injection molding from plastic material such as polyamide, polyurethane, and polypropylene for example. The materials could of course be strengthened and reinforced in known manner by inclusion of fibers such as carbon fibers or glass fibers. A preferred material for the coupling component is sold under the trademark Stanyl and comprises a polyamide that contains approximately 15% of glass fiber reinforcement.

Although specific embodiments of the invention are described in the foregoing by way of example, it will be appreciated that the invention is not restricted to the details of the disclosed embodiments, but rather extends to all embodiments falling within the ambit of the attached claims.

What is claimed is:

1. A coupling for sealingly connecting two fluid conduits in co-axial end-to-end relationship, wherein the conduits have respective male and female end sections that are configured for telescopic interengagement, each of the conduit end sections having an external peripheral shoulder, said coupling comprising:

a base member adapted to be carried on a first one of the fluid conduits adjacent and engaging the peripheral shoulder thereof;

and a retaining structure comprising two C-shaped, pivotally interconnected arms that are interengageable in confronting relationship to clampingly grip said base member when the C-shaped arms are pivoted from an open position to a closed position, said arms including a releasable lock that is operative to lock said retaining structure in engagement with said base member, said retaining structure defining an axially oriented abutment surface for contacting the peripheral shoulder of the second of the conduits when the two conduits are telescopically interengaged thereby preventing axial separation of the conduits when the two C-shaped arms are pivoted into the closed position and when the retaining structure is in locked condition.

2. A coupling as claimed in claim 1 wherein said base member includes an axially oriented pivot pin that defines a pivot axis for said C-shaped arms.

3. A coupling as claimed in claim 1 wherein at least one of said base member and said arms is fabricated as an integral plastic structure.

4. A coupling as claimed in claim 1 wherein said releasable lock comprises a tooth carried on a resilient finger on one said arm, and a retainer on the other said arm, wherein as said arms are moved towards the locked position, said finger is deflected until said tooth passes said retainer, whereupon the finger is resiliently restored to engage said tooth with said retainer.

5. A coupling as claimed in claim 1 wherein said base member comprises two separate sections that can be assembled onto the first fluid conduit in a radial direction.

6. A coupling as claimed in claim 1 wherein the first fluid conduit has an expanded diameter section extending from its end over a length of at least twice the diameter of the conduit, the external peripheral shoulder of the first fluid conduit providing a transition between said expanded diameter section and the adjacent part of the first conduit.

7. A coupling as claimed in claim 1 which includes a guard which in the engaged condition of the coupling shields said releasable lock against inadvertent disengagement.

8. A coupling as claimed in claim 7 further including frangible seal means associated with said releasable lock to give an indication of unauthorized disengagement of said releasable lock.

9. An arrangement comprising two fluid conduits and a coupling for sealingly connecting the two fluid conduits in co-axial end-to-end relationship, wherein the conduits have respective male and female end sections that are configured for telescopic interengagement, each of the conduit end sections having an external peripheral shoulder, said coupling comprising:

a base member adapted to be carried on a first one of the fluid conduits adjacent and engaging the peripheral shoulder thereof;

and a retaining structure comprising two C-shaped, pivotally interconnected arms that are interengageable in confronting relationship to clampingly grip said base member when the C-shaped arms are pivoted from an open position to a closed position, said arms including a releasable lock that is operative to lock said retaining structure in engagement with said base member, said retaining structure defining an axially oriented abutment surface for contacting the peripheral shoulder of the second of the conduits when the two conduits are telescopically interengaged thereby preventing axial separation of the conduits when the two C-shaped arms are pivoted into the closed position and when the retaining structure is in locked condition.

10. An arrangement as claimed in claim 9 wherein said C-shaped arms are pivotally interconnected.

11. An arrangement as claimed in claim 10 wherein said base member includes an axially oriented pivot pin that defines a pivot axis for said C-shaped arms.

12. An arrangement as claimed in claim 9 wherein at least one of said base member and said arms is fabricated as an integral plastic structure.

13. An arrangement as claimed in claim 9 wherein said releasable lock comprises a tooth carried on a resilient finger on one said arm, and a retainer on the other said arm, wherein as said arms are moved towards the locked position, said finger is deflected until said tooth passes said retainer, whereupon the finger is resiliently restored to engage said tooth with said retainer.

14. An arrangement as claimed in claim 9 wherein said base member comprises two separate sections that can be assembled onto the first fluid conduit in a radial direction.

15. An arrangement as claimed in claim 9 wherein the first fluid conduit has an expanded diameter section extending from its end over a length of at least twice the diameter of the conduit, the external peripheral shoulder of the first fluid conduit providing a transition between said expanded diameter section and the adjacent part of the first conduit.

16. An arrangement as claimed in claim 9 which includes a guard which in the engaged condition of the coupling shields said releasable lock against inadvertent disengagement.

17. An arrangement as claimed in claim 16 further including frangible seal means associated with said releasable lock to give an indication of unauthorized disengagement of said releasable lock.

18. A coupling for sealingly connecting two fluid conduits in co-axial end-to-end relationship, wherein the conduits have respective male and female end sections that are configured for telescopic interengagement, each of the conduit end sections having an external peripheral shoulder, said coupling comprising:

a base member adapted to be carried on a first one of the fluid conduits adjacent and engaging the peripheral shoulder thereof so as to prevent the peripheral shoulder thereof from moving axially away from a second one of the fluid conduits;

and a retaining structure comprising two C-shaped, pivotally interconnected arms that are interengageable in confronting relationship to clampingly grip said base member when the C-shaped arms are pivoted from an open position to a closed position, said arms including a releasable lock that is operative to lock said retaining structure in engagement with said base member, said retaining structure defining an axially oriented abutment surface for contacting the peripheral shoulder of the second of the conduits when the two conduits are telescopically interengaged thereby preventing axial separation of the conduits when the two C-shaped arms are pivoted into the closed position and when the retaining structure is in locked condition.

* * * * *